United States Patent
Schneider et al.

[19]

[11] Patent Number: 6,102,464
[45] Date of Patent: Aug. 15, 2000

[54] SPARE TIRE STORAGE COMPARTMENT COVER

[75] Inventors: Werner H. Schneider, Waterford; Sudhakar Kodali, Auburn Hills, both of Mich.

[73] Assignee: Chrysler Corporation, Auburn Hills, Mich.

[21] Appl. No.: 09/163,142

[22] Filed: Sep. 29, 1998

Related U.S. Application Data

[63] Continuation-in-part of application No. 08/731,198, Oct. 7, 1996, Pat. No. 5,842,730.

[51] Int. Cl.$^7$ .................................................. B62D 43/10
[52] U.S. Cl. ...................................... 296/37.3; 296/97.23
[58] Field of Search ................................ 296/37.2, 37.3, 296/39.1, 97.23; 160/230, 231.1, 231.2

[56] References Cited

U.S. PATENT DOCUMENTS

| | | | |
|---|---|---|---|
| Re. 33,200 | 4/1990 | Reynolds et al. | 296/39.1 |
| 2,321,753 | 6/1943 | King | 160/231.2 |
| 2,631,886 | 3/1953 | Keller | 296/37.2 |
| 2,659,687 | 11/1953 | Moore | 160/231.1 |
| 3,325,207 | 6/1967 | Anderson et al. | 296/37 |
| 3,460,860 | 8/1969 | Stevens, Jr. | 52/584.1 |
| 4,351,555 | 9/1982 | Hashimoto | 296/37.16 |
| 4,398,765 | 8/1983 | Ishikawa | 297/37.2 |
| 4,423,900 | 1/1984 | Sugimoto et al. | 296/37.14 |
| 4,536,025 | 8/1985 | Yamawaki et al. | 296/37.16 |
| 4,687,124 | 8/1987 | Mahr | 224/42.24 |
| 4,711,046 | 12/1987 | Herrgord | 40/605 |
| 4,830,241 | 5/1989 | Ulmer et al. | 224/42.2 |
| 4,848,826 | 7/1989 | Kuwabara et al. | 296/97.23 |
| 4,991,898 | 2/1991 | Nomura | 296/37.2 |
| 5,015,028 | 5/1991 | Bonnett | 296/107 |
| 5,050,926 | 9/1991 | Tanaka | 296/146 |
| 5,056,846 | 10/1991 | Tanaka | 296/37.1 |
| 5,056,858 | 10/1991 | Tanaka | 296/146 |
| 5,061,002 | 10/1991 | Saso | 296/37.3 |
| 5,080,417 | 1/1992 | Kanai | 296/37.3 |
| 5,238,284 | 8/1993 | Whitaker | 296/37.16 |
| 5,257,846 | 11/1993 | Kanai et al. | 296/37.14 |
| 5,322,335 | 6/1994 | Niemi | 296/97.23 |
| 5,427,428 | 6/1995 | Ericson et al. | 296/98 |
| 5,515,900 | 5/1996 | West et al. | 160/135 |
| 5,971,462 | 10/1999 | Bell et al. | 296/37.3 |

FOREIGN PATENT DOCUMENTS

| | | |
|---|---|---|
| 61-75035 | 4/1986 | Japan . |
| 61-75036 | 4/1986 | Japan . |
| 61-249850 | 11/1986 | Japan . |
| 6-247211 | 9/1994 | Japan . |

*Primary Examiner*—Joseph D. Pape
*Assistant Examiner*—Paul Chenevert
*Attorney, Agent, or Firm*—Roland A. Fuller, III

[57] ABSTRACT

A spare tire storage compartment cover has at least two sections joined by a living hinge. When the cover is in place over the spare tire storage compartment, it is held in place by a hook and loop-type fastener system that secures the first section in place. The second section, located toward the rear of the vehicle when the cover is in place, can be rotated relative to the first section to allow access to the spare tire storage compartment. The first and second sections are preferably formed from wood, such as composition board, and a carpet is secured to both sections in conventional fashion, such as by adhesive. A plastic living hinge joins the first and second sections.

3 Claims, 2 Drawing Sheets

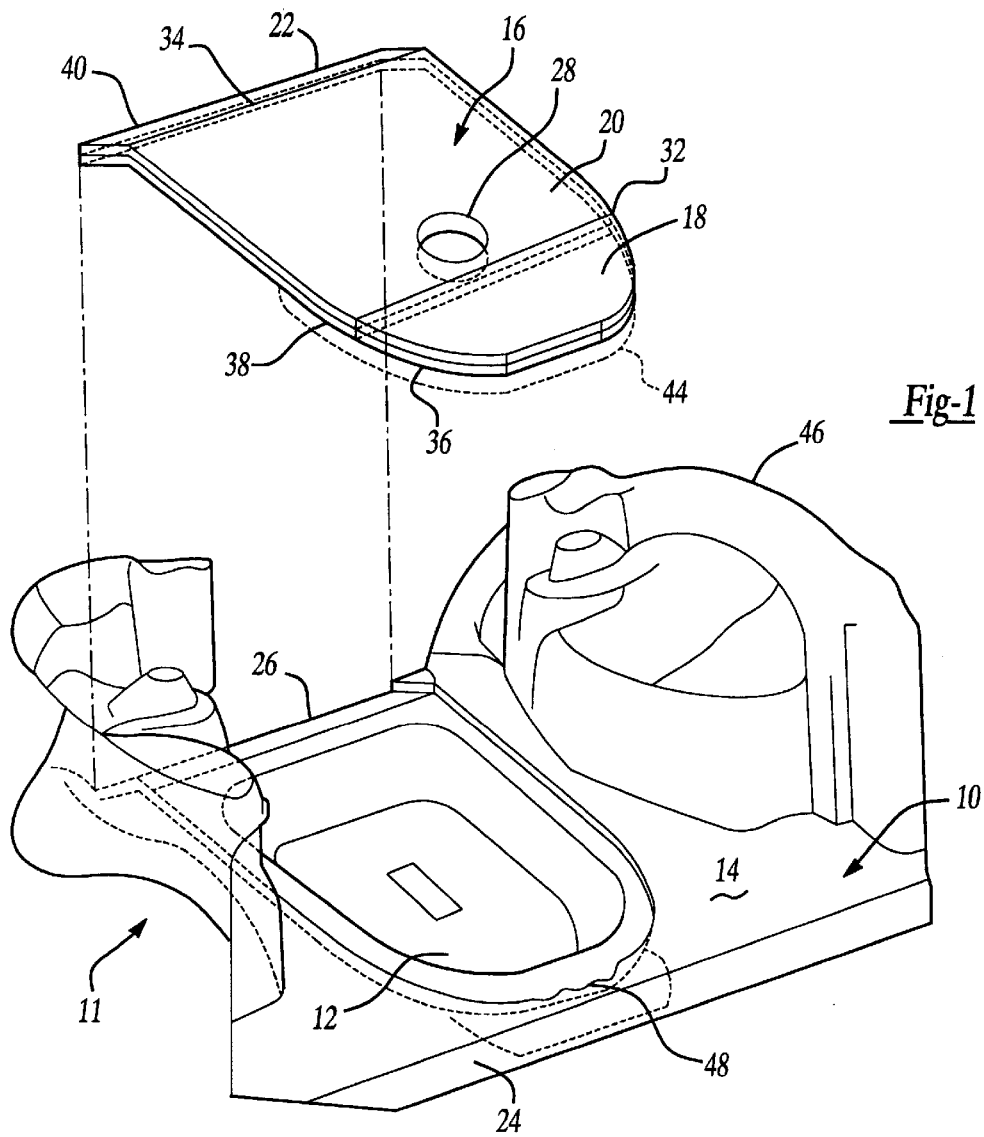
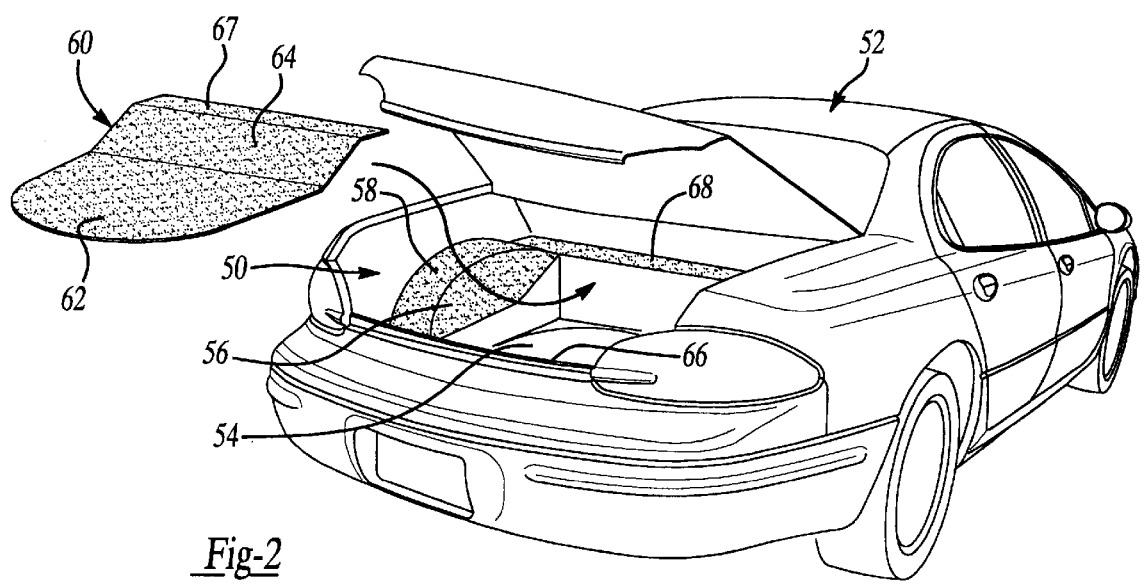

SPARE TIRE STORAGE COMPARTMENT COVER

This is a continuation-in-part of allowed U.S. patent application Ser. No. 08/731,198 filed Oct. 7, 1996 now U.S. Pat. No. 5,842,730 issued Dec. 1, 1998. This invention relates to covers for spare tire storage compartments in trunks of vehicles, and more particularly, to a spare tire storage compartment cover that allows easy access to the compartment in which the spare tire is stored to facilitate the use of unused space in that compartment as additional storage area in the trunk.

BACKGROUND OF THE INVENTION

In automobiles having trunks, the spare tire is often stored in a compartment formed in the bottom of the trunk, such as a well formed in the bottom of the trunk. The spare tire storage compartment is typically covered with a flat cover, made of composition board or other rigid material. When in place, the spare tire storage compartment cover is flush with the floor of the trunk surrounding the spare tire storage compartment and forms a portion of the floor of the trunk, usually a major portion. The cover is secured by a tie-down mechanism. Where the floor of the trunk is carpeted, the cover may also be covered by carpet.

The spare tire storage compartment often has unused space around the spare tire that could be used for storage. The problem with using this space for storage is that the spare tire storage compartment is not easily accessible in that the relatively large spare tire storage compartment cover must be removed to access it. Since the cover often forms a major portion of the floor of the trunk, the trunk must typically be emptied or nearly emptied to permit the cover to be removed. This is inconvenient and effectively precludes the use of the spare tire storage compartment as additional storage area.

It is an object of this invention to provide a spare tire storage compartment cover that permits ready access to the spare tire storage compartment by allowing the spare tire storage compartment to be accessed without removing the cover.

It is another object of this invention to provide a spare tire storage compartment cover that has at least two sections joined by a living hinge permitting easy access to the spare tire storage compartment by opening one of the two sections.

SUMMARY

A spare tire storage compartment cover in accordance with this invention has at least two sections joined by a living hinge. When the cover is in place over the spare tire storage compartment, it is held in place by a conventional tie-down mechanism that secures the second section in place. The first section, located toward the rear of the vehicle when the cover is in place, can be rotated relative to the second section to allow access to the spare tire storage compartment. The first and second sections are preferably formed from wood, such as composition board, and a carpet is secured to both sections in conventional fashion, such as by clips or adhesive. A plastic living hinge joins the first and second sections. The plastic living hinge includes two generally parallel rigid strip sections which are attached to the first and second sections and integrally formed with a central hinge section. The generally parallel rigid strip sections, along with a uniquely designed central hinge section, add additional support to the first and second sections in order to prevent sagging.

Additional features and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The present invention will become more fully understood from the detailed description and the accompanying drawings, wherein:

FIG. 1 is a perspective view of a trunk of a vehicle having a spare tire storage compartment and having a spare tire storage compartment cover according to the principles of the present invention;

FIG. 2 is a perspective view of a vehicle illustrating the insertion of the spare tire storage compartment cover according to the present invention being inserted into the trunk of the vehicle;

DETAILED DESCRIPTION OF A PREFERRED EMBODIMENT

Figure 3:
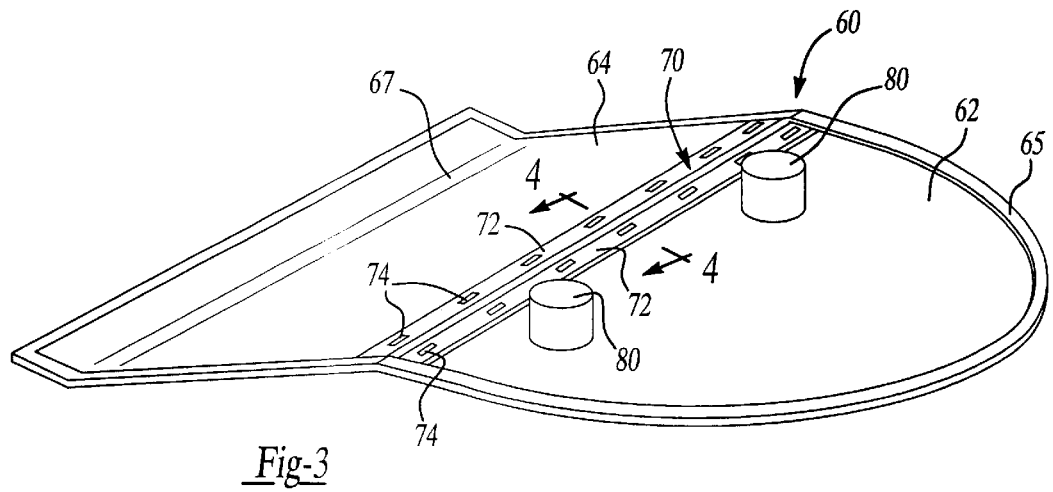
FIG. 3 is a perspective view of the bottom side of the spare tire storage compartment cover according to the present invention.

Referring to FIG. 1, a trunk 10 of a vehicle 11 has a spare tire storage compartment 12 formed as a well in the bottom of trunk 10. Trunk 10 has a floor 14. A layer of carpet 46 is affixed to the surface of floor 14 in conventional fashion, such as by clips. In the embodiment shown in FIG. 1, a spare tire storage compartment cover 16 has a first end section 18, a middle section 20, and a second end section 22. Alternatively, second end section 22 can be eliminated and middle section 20 enlarged accordingly so that cover 16 comprises first end section 18 and middle section 20 as illustrated in FIGS. 2 and 3. When cover 16 is in place over spare tire storage compartment 12, first end section 18 is adjacent a rear 24 of trunk 10 and second end section 22 is adjacent a front 26 of trunk 10. When cover 16 is in place, it is flush with the floor 14 of trunk 10 that surrounds spare tire storage compartment 12 and forms a relatively major portion of the floor 14 of trunk 10.

First end section 18 is hingedly joined to middle section 20 by a living hinge at 32. Second end section 22 is hingedly joined to middle section 20 either by conventional hinges or by a living hinge at 34.

In a preferred embodiment, first end section 18, middle section 20 and second end section 22 are formed by corresponding sheets of wood 36, 38, 40, such as composition board, with a layer of carpet 42 affixed, in conventional fashion such as by clips, to the top surfaces of sheets 36, 38, 40. The carpet provides the living hinge between first end section 18 and middle section 20 and second end section 22 and middle section 20. To provide additional strength, a second layer of carpet 44 can be affixed to the bottom surfaces of sheets 36, 38, 40.

In an alternative embodiment, first end section 18, middle section 20 and second end section 22 are formed from a sheet of plastic that is formed to provide a living hinge at 32 and at 34. Carpet 42 is affixed over the top surface of the plastic sheet and also provides living hinges at 32 and 34, which strengthens the living hinges at 32 and 34.

Cover 16 is secured in place over spare tire storage compartment 12 in conventional fashion by the use of a conventional tie-down mechanism (not shown) that extends through an access hole 28 in middle section 20. When cover 16 is in place, spare tire storage compartment 12 can be readily accessed by opening first end section 18 by rotating it upwardly with respect to middle section 20. To facilitate grasping of first end section 18, indentations 48 can be provided in the floor 14 of trunk 10 at the rear of spare tire storage compartment 12, which may be formed in the edge of carpet 46 that is adjacent first end section 18 at the rear of spare tire storage compartment 12.

While it is conventional to remove cover 16 when it is desired to fully open spare tire storage compartment 12, such as when removing a spare tire (not shown), second end section 22 can be secured to the front of trunk 10 and middle section 20 rotated upwardly with respect to second end section 22 to allow the spare tire storage compartment 12 to be fully opened.

Figure 4:
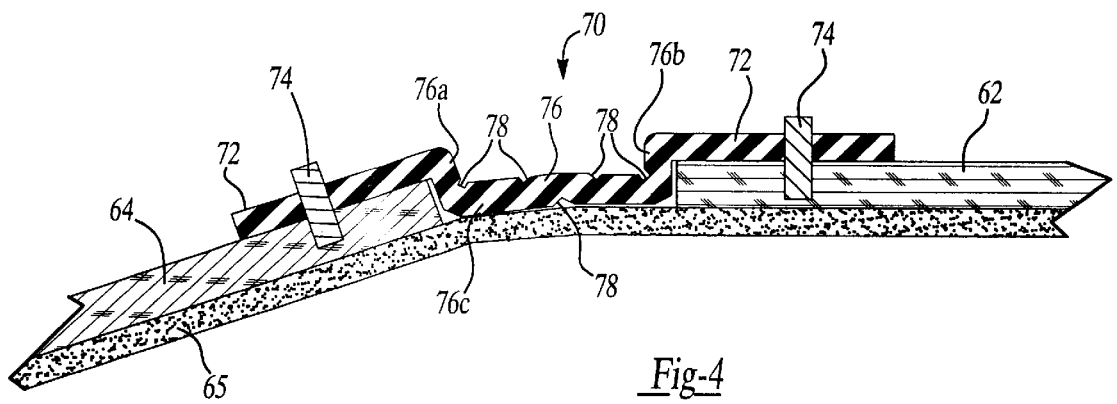
FIG. 4 is a cross sectional view taken along line 4—4 of FIG. 3.

With reference to FIGS. 2–4, a second embodiment of the present invention will now be described. Referring to FIG. 2, a trunk 50 of a vehicle 52 has a spare tire storage compartment 54 formed as a well in the bottom of trunk 50. Trunk 50 has a floor 56. A layer of carpet 58 is affixed to the surface of floor 56 in a conventional fashion, such as by clips or adhesive. In the embodiment shown in FIG. 2, a spare tire storage compartment cover 60 has a first end section 62 and a second end section 64 each preferably formed from composition board and covered by a layer of carpet 65. When cover 60 is in place over spare tire storage compartment 54, first end section 62 is adjacent a rear 66 of trunk 50 and second end section 64 is adjacent a front 68 of trunk 50. Second end section 64 is provided with a bend portion 67 formed in the composition board for conforming to the shape of the floor 56 of trunk 50. When the cover 60 is in place, it is flush with the floor 56 of trunk 50 that surrounds spare tire storage compartment 54 and forms a relatively major portion of the floor 56 of trunk 50.

As shown in FIGS. 3 and 4, first end section 62 is hingedly joined to second end section 64 by a plastic living hinge 70. Living hinge 70 is extruded as a unitary member and includes a pair of rigid parallel strip portions 72 which are fastened to the first end section 62 and second end section 64, respectively. Preferably, the strip sections 72 are fastened to the first and second end sections 62, 64 of the storage compartment cover 60 by staples 74. The plastic living hinge 70 also includes an integrally formed flexible central hinge portion 76 which includes a pair of opposing generally vertical sidewalls 76a, 76b and a generally horizontal connecting portion 76c disposed in a plane offset from the pair of rigid parallel strip portions 72, the connecting portion 76c is provided with a plurality of grooves 78 which increase the flexibility of the central hinge portion 76. The rigid strip portions 72 provide rigidity to the first and second end sections 62, 64 and along with the generally vertical sidewalls 76a, 76b of the central hinge portion 76 help to prevent sagging of the spare tire storage compartment cover 60. In addition, foam pillars 80 are mounted to the underside of the front end section 62 of the spare tire storage compartment cover 60 and are designed to rest against a spare tire stored in the spare tire storage compartment 54. Thus, when items are stored in the trunk compartment 56, over top of the spare tire storage compartment cover 60, the rigid side strips 72 and the generally vertical sidewalls 76a, 76b of the central hinge portion 76 provide rigidity to the spare tire storage compartment cover 60 in addition to the added support provided by the foam pillars 80 resting against the spare tire. According to a preferred embodiment, a hook and loop-type fastener system (otherwise known by the trade name VELCRO) is utilized to secure the spare tire storage compartment cover 60 in place. The carpeting 58 on the floor of the trunk can be used to act as the loop portion of the hook and loop-type fastener system so that only a hook-type fastener 82 need be fastened to the underside of the cover 60.

Although the invention has been described in detail with reference to certain preferred embodiments and specific examples, variations and modifications exist within the scope and spirit of the invention as defined in the following claims.

What is claimed is:

1. A cover for a spare tire storage compartment in a trunk of an automobile, said cover comprising first and second sections joined by a living hinge, wherein, when said cover is in place over said spare tire storage compartment, said first section is at a rear of said trunk and can be rotated upwardly with respect to said second section permitting ready access to said spare tire storage compartment, wherein said living hinge is made of a plastic material and includes a pair of generally parallel rigid strip sections integrally formed with and on opposite sides of a central hinge portion, each of said pair of generally parallel rigid strip sections are fastened to one of said first and second sections of said cover, wherein said first and second sections are made from sheets of rigid material covered by a layer of carpet and wherein said carpet joins said first and second sections along with said living hinge, wherein said sheets of rigid material are sheets of composition board, and wherein said second section of said cover including a bend portion formed in said sheet of composition board.

2. The cover according to claim 1, wherein said central hinge portion of said living hinge includes a pair of opposing sidewalls and a connecting portion extending between said sidewalls in a plane offset from said pair of rigid strip sections.

3. A cover for a spare tire storage compartment in a trunk of an automobile, the cover comprising first and second sections joined by a living hinge, wherein, when the cover is in place over the spare tire storage compartment, the first section is at a rear of the trunk and can be rotated upwardly with respect to the second section permitting ready access to the spare tire storage compartment, wherein said living hinge is made of a plastic material and includes a pair of generally parallel rigid strip sections integrally formed with and on opposite sides of a central hinge portion, each of said pair of generally parallel rigid strip sections are fastened to one of said first and second sections of said cover; and a pair of foam pillars mounted to said first section of said cover and adapted to rest against a spare tire in the spare tire storage compartment.

* * * * *